(12) United States Patent
Wenzel et al.

(10) Patent No.: US 7,587,050 B2
(45) Date of Patent: Sep. 8, 2009

(54) METHOD, SYSTEM, BASE STATION AND DATA CARRIER FOR CLASH-FREE TRANSMISSION BETWEEN A BASE STATION AND A NUMBER OF MOBILE DATA CARRIERS

(75) Inventors: Dirk Wenzel, Hamburg (DE); Wolfgang Tobergte, Halstenbek (DE)

(73) Assignee: NXP B.V., Eindhoven (NL)

( * ) Notice: Subject to any disclaimer, the term of this patent is extended or adjusted under 35 U.S.C. 154(b) by 672 days.

(21) Appl. No.: 10/555,551

(22) PCT Filed: Apr. 28, 2004

(86) PCT No.: PCT/IB2004/050528

§ 371 (c)(1),
(2), (4) Date: Nov. 4, 2005

(87) PCT Pub. No.: WO2004/100051

PCT Pub. Date: Nov. 18, 2004

(65) Prior Publication Data

US 2007/0042796 A1 Feb. 22, 2007

(30) Foreign Application Priority Data

May 8, 2003 (EP) .................................. 03101275

(51) Int. Cl.
*H04L 9/00* (2006.01)
(52) U.S. Cl. .......................... 380/267; 455/70; 380/270

(58) Field of Classification Search ...................... 726/3, 726/9, 185; 713/150, 160; 709/227; 380/267, 380/270; 455/507
See application file for complete search history.

(56) References Cited

U.S. PATENT DOCUMENTS

| | | | | |
|---|---|---|---|---|
| 3,706,094 A | * | 12/1972 | Cole et al. | 342/44 |
| 4,975,952 A | * | 12/1990 | Mabey et al. | 713/160 |
| 6,211,776 B1 | * | 4/2001 | Rohrl et al. | 340/426.16 |
| 6,289,105 B1 | * | 9/2001 | Murota | 380/286 |
| 6,354,500 B1 | * | 3/2002 | Gercekci et al. | 235/451 |

FOREIGN PATENT DOCUMENTS

| | | |
|---|---|---|
| EP | 0 805 575 | 11/1997 |
| EP | 1 225 536 | 7/2002 |

* cited by examiner

*Primary Examiner*—Gilberto Barron, Jr.
*Assistant Examiner*—Simon Kanaan

(57) ABSTRACT

To enable a method and a system, having at least one base station and/or one data carrier, for transmitting signals between the base station and a number of mobile data carriers operating in the crypto mode or in the plain mode, wherein [a] the base station emits at least one command signal and/or data signal that is provided with at least one identifying pattern, [b] at least one of the data carriers receives the command signal and/or data signal emitted by the base station that is provided with the identifying pattern, [c] at least one of the data carriers that receive the command signal and/or data signal transmits to the base station a response signal that is a response to the command signal and/or data signal, and [d] the base station receives the response signal transmitted by the data carrier.

19 Claims, 2 Drawing Sheets

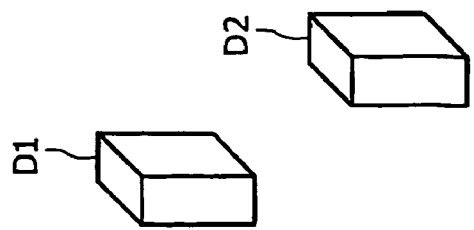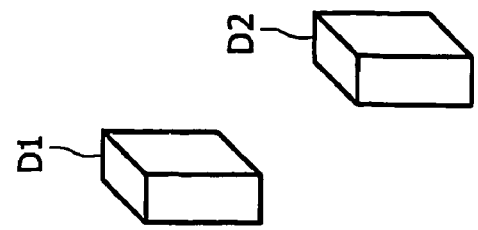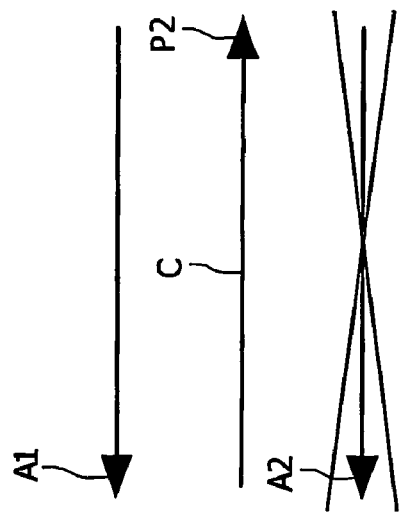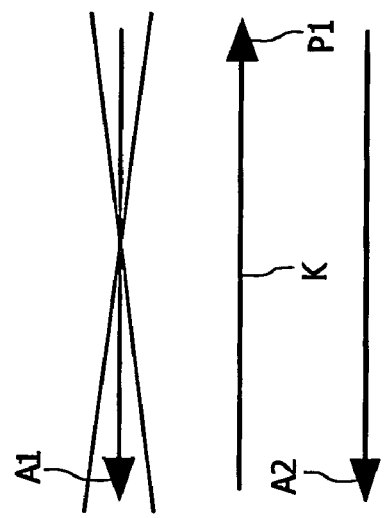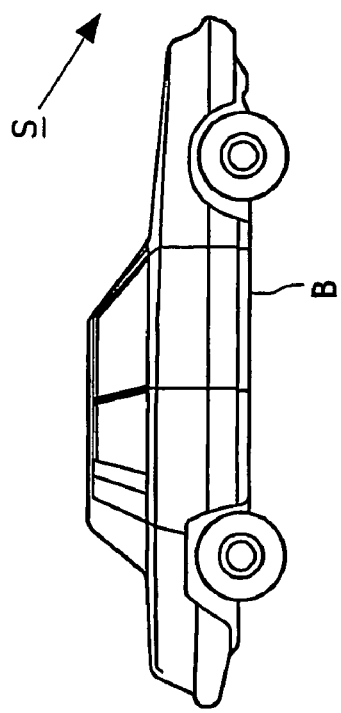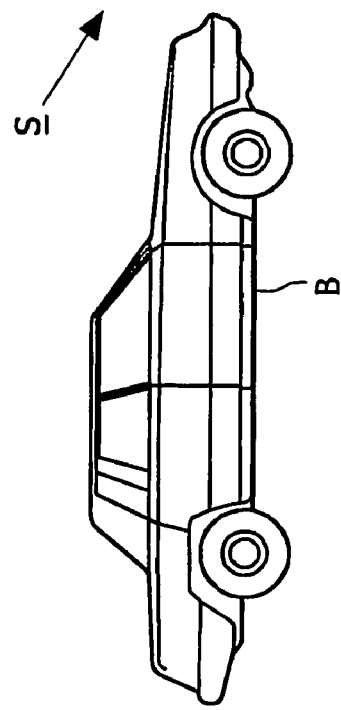

Figure 1:
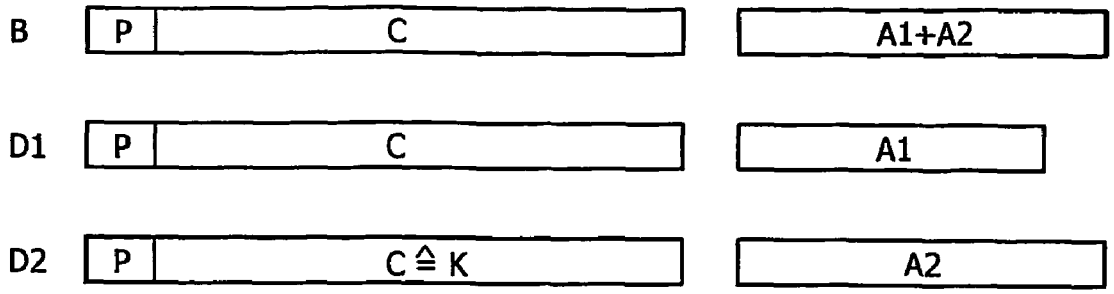

METHOD, SYSTEM, BASE STATION AND DATA CARRIER FOR CLASH-FREE TRANSMISSION BETWEEN A BASE STATION AND A NUMBER OF MOBILE DATA CARRIERS

The present invention relates to a method of transmitting signals between at least one base station and a number of mobile data carriers operating in the crypto mode or in the plain mode, wherein

[a] the base station emits at least one command signal and/or data signal that is provided with an identifying pattern,

[b] at least one of the data carriers receives the command signal and/or data signal emitted by the base station that is provided with the identifying pattern,

[c] at least one of the data carriers that receive the command signal and/or data signal transmits to the base station a response signal that is a response to the command signal and/or data signal, and

[d] the base station receives the response signal transmitted by the data carrier (see printed publication EP 1 225 536 A1).

The present invention also relates to a system for transmitting signals, having at least one base station for emitting at least one command signal and/or data signal provided with at least one identifying pattern, a number of mobile data carriers operating in the crypto mode or in the plain mode, at least one of which is able to be present and/or move in the operating zone or reading zone of the base station, i.e. in particular within the signal transmission range of the base station, receives the command signal and/or data signal, and transmits to the base station at least one response signal that is a response to the command signal and/or data signal.

The present invention also relates to a base station and to a mobile data carrier for a system of the above-mentioned kind for transmitting signals.

Mobile data carriers of the kind referred to above, which will also be referred to below as "transponders" and which are preferably arranged for the non-contacting exchange or transfer of data with or to the base station, which is also referred to as a "reading unit" or "reader", are in general use for the purposes of identification and access control, or as data stores on movable items.

Examples of data carriers of this kind are non-contacting chip cards in identification or access control systems (so-called P[assive] K[eyless] E[ntry] systems), arrangements for immobilizers in motor vehicle keys, electronic baggage markers ("baggage tags") for the automatic distribution and sorting of items of baggage in baggage handling operations, at airports say, and electronic memories for sorting and tracking in the transportation of packets and parcels.

All the above applications or systems have a base station that exchanges data with the transponders or transfers data to the transponders.

In the case of systems that are equipped with only a single communication or transmission channel, operating for example at an I[ndustry] S[cience] M[edicine] frequency or at a R[adio] F[requency], and that have a base station and a number of mobile data carriers, there may be a plurality of data carriers that are present and/or moving at the same time in the operating zone or reading zone of the base station, i.e. particularly in the latter's signal transmission range; fresh transponders enter the operating zone or reading zone and others leave it to the degree that the transponders in question are moved in space, with for example the pieces of baggage to which they are attached.

To ensure a reliable exchange or transfer of data between the base station and the transponders in systems of this kind, use is made of methods and systems for the transmission of data in which the base station transmits a command signal and/or data signal, such as, for example, a sequence of anti-clash commands, and the transponder responds to this command signal and/or data signal with a response signal (a so-called R[eader] T[alks] F[irst] method or R[eader] T[alks] F[irst] system).

The possibility then exists of encrypting the exchange or transfer of data with or to the chosen, i.e. selected transponders, which means that in many applications the transmission of data can take place not only directly but also in encrypted form. The transmission of the commands and/or data can thus take place in an unencrypted form (=in a non-encrypted or plain-language form or "plain mode") or in an encrypted form (=in a "crypto mode"), to enable the transponders addressed by the base station to be separated or distinguished.

A problem then arises in that the commands and/or data that are transmitted by the base station in encrypted mode may represent or contain random, unpredictable bit sequences, or may be mapped onto random, unpredictable bit sequences of this kind.

For this reason, the possibility cannot be ruled out that a command or data segment that is transmitted by the base station in encrypted form to a transponder that is in the crypto mode may, by chance, be equivalent or correspond to some other unencrypted command or data segment and/or may be identical to some other unencrypted command or data segment, and that one or more transponders that are not in the crypto mode will also respond to this command or data segment. This problem that arises with the conventional procedure will be elucidated below by reference to FIG. 1.

For this purpose, there are shown along a time axis that extends horizontally in FIG. 1 in the left-hand part of the first line in FIG. 1:

the temporal sequence formed by a command signal or data signal (=command C or data, encrypted) that is provided with a conventional identifying pattern P and is emitted by the base station B, in the left-hand part of the second line in FIG. 1:

the temporal sequence formed by the encrypted command signal or data signal (=command C or data, encrypted) that is then received by a first data carrier (=transponder) D1 that is in the crypto mode, and in the left-hand part of the third line in FIG. 1:

the temporal sequence formed by the command signal or data signal that is received substantially at the same time by a second data carrier (=transponder) D2 that is in the unencrypted or non-encrypted plain mode, which command signal or data signal happens, from the point of view of the second data carrier D2, to be equivalent or to correspond to an unencrypted command K, i.e. is identical to an unencrypted command K; during the interval of time within which the transmission of the encrypted command signal or data signal C from the base station B to the first transponder D1 that has actually been chosen (=selected) takes place, the second transponder D2 is just being transported into the operating zone or reading zone of the base station B.

With the signals arranged as shown in FIG. 1, the base station B thus emits the encrypted command C or data signal and this is received by the first transponder D1, which is in the encrypted mode or crypto mode, as an encrypted command C, whereas it is received by a second transponder D2, which is in the normal unencrypted mode or plain mode, as an unencrypted command K.

In this case, the first (and only) identifying pattern P in FIG. 1 marks the start of the command C or data signal; the identifying pattern shown in FIG. 1 is thus a conventional start pattern.

In the representation shown in FIG. 1, it is assumed that, from the point of view of the transponder D2 that has not in fact been selected, the encrypted command C or data signal that is emitted by the base station B is precisely equivalent or corresponds to an unencrypted command K from the base station B, i.e. is identical to an unencrypted command K from the base station B; this is possible because commands and/or data that are transmitted in encrypted form by the base station B may constitute or contain unpredictable (random) bit sequences or may be mapped onto such.

In the case shown in FIG. 1, both the transponders D1 and D2 situated in the operating zone or reading zone of the base station B respond, i.e.

both the first transponder D1 that is in the crypto mode
(=response signal A1 in the right-hand part of the second line in FIG. 1)
and also the second transponder D2 that is in the plain mode
(=response signal A2 in the right-hand part of the third line in FIG. 1).

What this means is that the two transponders D1 and D2 each transmit respective data signals A1 and A2 back to the base station B, as is shown in the right-hand part of FIG. 1. The base station B receives the superimposed data signals A1+A2 from the two transponders D1 and D2 with errors in their data, because, if there is no variation between the identifying or starting patterns P, the base station B is unable to separate the two response signals A1+A2 from one another (=right-hand part of the first line in FIG. 1).

So, the conventional set of problems can be summed up as follows:

Because of the fact that the first transponder D1 is using encryption, i.e. is operating in the crypto mode, whereas the second transponder D2 is not doing so, i.e. is operating in the plain mode, the first transponder D1 operating in the crypto mode detects the "right", because encrypted, command C that was emitted, whereas the second transponder D2 operating in the plain mode interprets the data coming from the base station B as a wrong command K.

This leads to errors in the data because not only does the first transponder D1, which is operating in the crypto mode, rightly and with due authority respond to the original signal from the base station B that was intended for the crypto mode, but so too, wrongly and unexpectedly, does the second transponder D2, which is operating in the plain mode, and the response signal A1 from the first transponder D1 and the response signal A2 from the second transponder D2 are then superimposed on each other.

So, in short, both the transponder D1 that was actually selected and also the transponder D2 that was not selected and, what is more, all the other transponders that are present in and/or moving in the operating zone or reading zone of the base station B at the time, may respond simultaneously. However, a superimposition of the response signals A1, A2 that occurs in this way leads to errors in the data.

What is more, data in the memory of the second transponder D2 may even by destroyed if, for example, the command K that is wrongly interpreted by the second transponder D2 is equivalent or corresponds to a write command, i.e. is identical to a write command.

Taking the disadvantages and shortcomings described above as a point of departure and with due allowance for the prior art outlined above, it is an object of the present invention to further develop a method of the kind detailed in the opening paragraphs and a system, a base station and/or a data carrier of the kinds specified in the opening paragraphs in such a way that the problems reviewed above are avoided in a simple yet effective way, thus ensuring the reliable transmission of data, and hence a reduction in the error rate, in methods and systems employing encrypted transmission of data.

This object is achieved by a method having the features given in claim 1, a system having the features given in claim 4, a base station having the features given in claim 10, and a data carrier having the features given in claim 11. Advantageous embodiments and useful refinements of the present invention are detailed in the characterizing clauses of the respective sets of dependent claims.

Thus, under the teaching of the present invention, at least two different identifying patterns, and in particular start patterns, that can be clearly distinguished from one another are used for the reliable exchange or transfer of data between the base station, which is, for example, in the form of a reading unit or reader, and the data carriers (transponders), thus enabling the particular data carriers (transponders) that are addressed by the base station to be clearly separated or clearly distinguished from one another.

In this way it is ensured that an encrypted command signal and/or data signal is not misinterpreted or misunderstood as an unencrypted command signal or data signal by at least one data carrier operating in the plain mode and an unencrypted command signal or data signal is not misinterpreted or misunderstood as an encrypted command signal or data signal by at least one data carrier operating in the crypto mode.

For this purpose, at least one first identifying pattern is used to identify or mark commands and/or data in the plain mode, whereas at least one second identifying pattern differing from the first identifying pattern identifies or marks all the commands and/or data that are transmitted in the crypto mode.

In a particularly advantageous embodiment of the present invention, the first identifying pattern and/or the second identifying pattern can also be clearly distinguished from the data, for example by way of a least one code violation.

Identifying or start patterns of this kind deliberately cause at least one coding error in the data stream proper, a process that can advantageously be implemented by means of code violations of different forms and/or
by means of different lengths and/or
by means of different start patterns As has already been stated above, the first start pattern may, in accordance with the invention, be used to identify commands in the standard or plain mode, whereas the second start pattern may identify all the data that is transmitted in the crypto mode.

This is an advantageous way of ruling out the possibility of transponders operating in the plain mode mistakenly interpreting commands or data transmitted in the crypto mode as commands intended for them; the possibility is then equally ruled out of transponders operating in the crypto mode mistakenly interpreting commands or data transmitted in the plain mode as commands intended for them.

If, as above, the (first or second) identifying pattern is also designated the (first or second) start pattern, then it is assumed that this (first or second) pattern will be arranged at the beginning of the signal. In advantageous embodiments of the present invention, the pattern for identifying the encryption may also be situated at the end of the command signal or data signal or at any desired position within the command signal or data signal.

In summary, it can be stated that what is achieved by the method according to the present invention and by a system according to the present invention is reliable transmission of data, and consequently a reduction in the error rate, in methods and systems employing encrypted data transmission to the transponder.

What is also ensured is effective protection for the data held in store in the transponders, because the possibility is ruled out of the transponders that are present and/or moving in the operating zone or reading zone of the base station, i.e. that are present and/or moving in particular within the signal transmission range of the base station, wrongly interpreting the commands or data (segments) coming from the base station; what "wrongly interpreting" means in this connection is that a command signal or data signal that is transmitted by the base station in the crypto mode is viewed by the transponder as unencrypted and is processed by it, and/or a command signal or data signal that is transmitted by the base station in the plain mode is viewed by the transponder as encrypted and is processed by it.

To allow use to be made of these advantages, the signals that are transmitted by the base station for the selected data carrier or the selected data carriers have assigned to them at least one first identifying pattern or at least one second identifying pattern that differs from the first identifying pattern, by which pattern these signals are marked as having been transmitted by the base station for the said selected data carrier(s), thus enabling the particular data carrier addressed by the base station to be clearly separated or clearly distinguished.

Consequently, a distinction can be made, or a differentiation performed, in a manner essential to the invention, by the type and/or by the character and/or by the intrinsic nature of the given command signal or data signal (such as, for example, whether it is an encrypted command signal or data signal or an unencrypted command signal or data signal) and/or by the type and/or by the character and/or by the intrinsic nature of the given data carrier (such as, for example, whether it is a data carrier operated in the crypto mode, and in particular a transponder operating in the crypto mode, or a data carrier operating in the plain mode, and in particular a transponder operating in the plain mode).

For this purpose, the given identifying pattern, and in particular the given start pattern, can be individually adjusted, in a manner essential to the invention to the type and/or to the character and/or to the intrinsic nature of the given command signal or data signal to which the identifying pattern is assigned (for example, by being placed at the front of it, transmitted with it, or placed at the rear of it) and/or to the type and/or to the character and/or to the intrinsic nature of the given data carrier to which the command signal or data signal provided with the given identifying pattern is applied.

This proves to be particularly useful when the system for transmitting data between the base station and the data carriers has only a single communication or transmission channel, in for example what is termed the I[ndustry] S[cience] M[edicine] band.

As a supplement to this, it is found to be technically useful that the emission to the base station of, preferably, responding data signals in response to the reception of at least one command signal or data signal having the given identifying pattern can be suppressed in all the data carriers that have not been selected by the base station for the transmission of data, this being done regardless of the rest of the content of the command signal or data signal transmitted by the base station.

The fact of the signals transmitted by the base station for the selected data carrier or data carriers being provided with the identifying or start pattern that is applicable thus produces a variation from an identifying and start pattern that, conventionally, i.e. in the prior art, is single and universal.

What this means is that at least two different identifying or start patterns are used, which are clearly distinguished from one another and by means of which the data carriers, i.e. transponders, are able to distinguish, or differentiate between, the command signals or data signals that are transmitted in different forms; the identifying or start patterns can also be clearly distinguished from the data, by what are termed "code violations", for example.

Finally, the present invention relates to the use of a method of the kind described above and/or of at least one system of the kind described above for the clash-free transmission of signals in non-contacting chip cards in identification or access control systems (so-called P[assive] K[eyless] E[ntry] systems), in arrangements for immobilizers in motor vehicle keys, in electronic baggage markers ("baggage tags") for the automatic distribution and sorting of items of baggage in baggage handling operations, at airports say, and in electronic memories for sorting and tracking in the transportation of packets and parcels.

As has already been discussed above, there are various possible ways of embodying and developing the teaching of the present invention in an advantageous manner. In this connection, reference should on the one hand be made to the claims respectively dependent on claim 1 and claim 4 and on the other hand these and other aspects of the invention will be apparent from and will be elucidated with reference to the embodiments described hereinafter with reference to FIGS. 2A to 3B.

In the drawings:

FIG. 1 is a diagrammatic representation of an example of a conventional succession of command signals or data signals exchanged between a base station and transponders, in the conventional method where there is no variation in the identifying pattern forming the start pattern, as a result of which errors occur in the data.

Figure 2A:
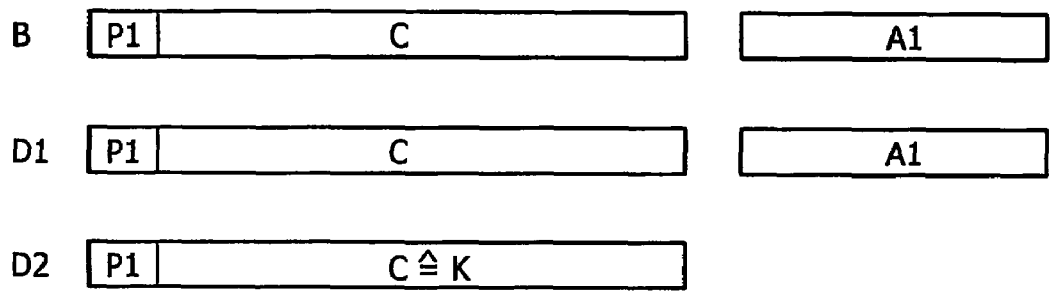

FIG. 2A is a diagrammatic representation of an embodiment of signal succession according to the invention which applies in the case of encrypted command signals or data signals exchanged between a base station and transponders, which signal succession exists in the method arranged in accordance with the present invention where there is a variation in the start pattern, as a result of which errors in the data are avoided.

Figure 2B:
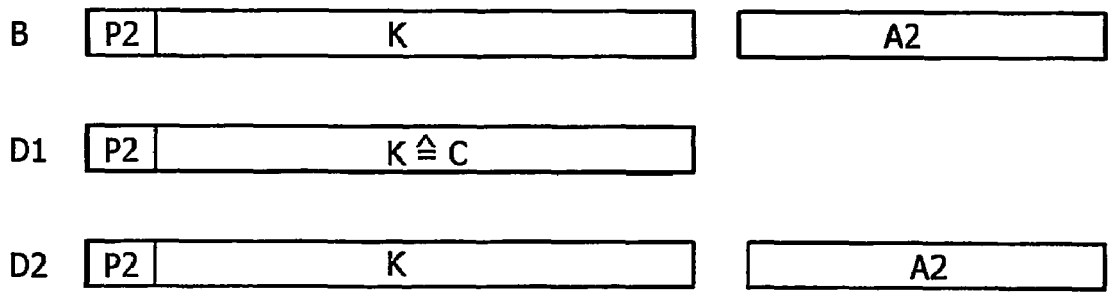

FIG. 2B is a diagrammatic representation of a signal succession according to the present invention, similar to that shown in FIG. 2A, which applies in the case of unencrypted data signals exchanged between a base station and transponders, which signal succession exists in the method shown in FIG. 2A, i.e. in a method where there is a variation in the start pattern as a result of which errors in the data are avoided.

FIG. 3A is a diagrammatic representation of an embodiment of a system according to the present invention that makes use of the method according to the present invention that is illustrated in FIG. 2A, and FIG. 3B is a diagrammatic representation of a system as shown in FIG. 3A that makes use of the method according to the present invention that is illustrated in FIG. 2B.

Arrangements, elements or features that are the same or similar in FIGS. 1 to 3B are given the same reference numerals.

Shown along a time axis that extends horizontally are
in the left-hand part of the first line in FIG. 2A:

the temporal sequence formed by an encrypted command signal or data signal (=command C or data, encrypted) that is emitted by a base station B (see FIG. 3A), in the left-hand part of the second line in FIG. 2A:

the temporal sequence formed by the encrypted command signal or data signal (=command C or data, encrypted) that is then received by a first data carrier (=transponder) D1 (see FIG. 3A) that is in the crypto mode, and in the left-hand part of the third line in FIG. 2A:

the temporal sequence formed by the encrypted command signal or data signal that is received substantially at the same time by a second data carrier (=transponder) D2 (see FIG. 3A) that is in the plain mode, which command signal or data signal happens however to be equivalent or to correspond to an unencrypted command signal or data signal K, i.e. is identical to an unencrypted command signal or data signal K, which means that it is assumed in the representation of the embodiment shown in FIGS. 2A and 3A that, from the point of view of the second transponder D2 that has not been selected, the encrypted command signal or data signal C emitted by the base station B is precisely equivalent to or corresponds to an unencrypted command signal or data signal K from the base station B, i.e. is identical to an unencrypted command signal or data signal K from the base station B.

Shown in a similar way along a horizontally extending time axis are
in the left-hand part of the first line in FIG. 2B:

the temporal sequence formed by an unencrypted command signal or data signal (=command K or data, unencrypted) that is emitted by the base station B (see FIG. 3B), in the left-hand part of the second line in FIG. 2B:

the temporal sequence formed by the unencrypted command signal or data signal (=command K or data, unencrypted) that is then received by the first data carrier D1 (see FIG. 3B) that is in the crypto mode, which command signal or data signal happens however to be equivalent to or to correspond to an encrypted command signal or data signal C, i.e. is identical to an encrypted command signal or data signal C, which means that it is assumed in the representation of the embodiment shown in FIGS. 2B and 3B that, from the point of view of the first transponder D1 that has not been selected, the unencrypted command signal or data signal K emitted by the base station B is precisely equivalent to or corresponds to an encrypted command signal or data signal C from the base station B, i.e. is identical to an encrypted command signal or data signal C from the base station B, and in the left-hand part of the third line in FIG. 2B:

the temporal sequence formed by the unencrypted command signal or data signal (=command K or data, unencrypted) that is received substantially at the same time by the second data carrier D2 (see FIG. 3B) that is operating in the plain mode.

As can be seen from the succession of signals that is shown by way of illustration in FIGS. 2A and 2B, the problems that were described above by reference to FIG. 1 (errors in the data as a result of the superimposition of two or more response signals A1, A2; risk of the data held in store in at least one transponder D2 being overwritten and thus destroyed) are easily solved by the present invention.

For this purpose, the commands or data in the command signals/data signals C and K that are to be emitted by the base station B (=a reading unit or reader, for example) have placed in front of them, in a manner essential to the invention, respectively a first identifying pattern P1 and a second identifying pattern P2, which patterns effect a differentiation by the type, by the character or by the intrinsic nature of the given command signals/data signals C and K. The first identifying pattern P1 and the second identifying pattern P2 differ from one another clearly in respect of their respective start patterns, thus enabling the transponder D1 or D2 that is being addressed by the base station B in the particular case to be clearly separated, i.e. clearly distinguished, by the base station B.

Whereas the first identifying pattern P1 is designed for the encrypted or crypto mode, the second identifying pattern P2 is designed for the unencrypted or plain mode.

This being the case, the first identifying pattern P1 acts as a so-called start pattern to mark the beginning of the command C that is present in encrypted form or of the encrypted data (see FIGS. 2A and 3A), which means that the first transponder D1 that is operating in the crypto mode and is situated in the operating zone or reading zone of the base station B (see FIG. 3A) reacts to the first identifying pattern P1 for the crypto mode and thus responds to the encrypted command signal or data signal (=command C or data, encrypted) that is emitted by the base station B, the response taking the form of the response signal A1 (see FIGS. 2A and 3A), whereas, the second transponder D2, that is operating in the plain mode and is also situated in the operating zone or reading zone of the base station B (see FIG. 3A), does not react to the first identifying pattern P1 for the crypto mode and thus does not respond, in the form of a response signal (see FIGS. 2A and 3A), to the encrypted command signal or data signal (=command C or data, encrypted) that is emitted by the base station B.

In a similar way to this, the second identifying pattern P2 acts as a so-called start pattern to mark the beginning of the command K that is present in unencrypted form or of the unencrypted data (see FIGS. 2B and 3B), which means that the first transponder D1 that is operating in the crypto mode and is situated in the operating zone or reading zone of the base station B (see FIG. 3B) does not react to the second identifying pattern P2 for the plain mode and thus doe not respond, in the form of a response signal (see FIGS. 2B and 3B), to the unencrypted command signal or data signal (=command K or data, unencrypted) that is emitted by the base station B, whereas, the second transponder D2, that is operating in the plain mode and is also situated in the operating zone or reading zone of the base station B (see FIG. 3B), does react to the second identifying pattern P2 for the plain mode and thus does respond, in the form of the response signal A2 (see FIGS. 2B and 3B), to the unencrypted command signal or data signal (=command K or data, unencrypted) that is emitted by the base station B.

The second identifying pattern P2, which is for example only one bit long, differs from the first identifying pattern P1 in respect of its start pattern. What the first identifying pattern P1 marks in this case is the fact that the encrypted command C that was emitted with the relevant data signal by the base station B applies only to transponder D1, which is operating in the crypto mode; hence what is marked by the second identifying pattern P2 is the fact that the unencrypted command K that was emitted with the relevant data signal by the base station B applies only to transponder D2, which is operating in the plain mode.

The identifying pattern P1 or P2 need not necessarily be positioned at the beginning of the command signal or data signal C or K in this case but may equally well be provided at any desired point within the data transmission or at the end thereof.

It is, however, a criterion for the making of a distinction that encrypted signals C are marked by the first identifying pattern P1 whereas unencrypted signals K are marked by the second identifying pattern P2. On this basis, the two transponders D1, D2 are thus able reliably to detect, by reference to the identifying pattern P1 or P2, whether what is involved is a command signal or data signal C for the first transponder D1 that has been selected or a command signal or data signal K for the second transponder D2 that has been selected.

Due to the variation in the identifying pattern, and in particular start pattern, P1 or P2 in the transmission protocol, there is thus an assurance of smooth, reliable and fault-free exchange or transfer of data between the base station B and the transponders D1, D2, because an encrypted command signal or data signal C from the base station B is always distinguished from an unencrypted command signal or data signal K from the base station B by the respective identifying patterns P1 and P2.

So, if the base station B emits a command signal or data signal C of this kind that is provided with the first identifying or start pattern P1 (see the left-hand half of the first line in FIG. 2A, and FIG. 3A), or in other words, if the base station B emits an encrypted command signal or data signal C in which the identifying or start pattern is set to the first value P1 that marks this command signal or data signal C as having been transmitted by the base station B solely for the first transponder D1 that has been selected, and if this command signal or data signal C is received both by the first transponder D1, which has been selected, (see the left-hand part of the second line in FIG. 2A, and FIG. 3A), and also by the second transponder D2, which has not been selected, (see the left-hard part of the third line in FIG. 2A, and FIG. 3A), both the transponders D1, D2 will recognize that the command signal or data signal in question is intended solely for a transponder that is in the crypto mode and has thus been selected.

Because the second transponder D2 is in the unencrypted or plain mode, and is thus in the non-selected state, it ignores the command signal or data signal C emitted by the base station B, even though it would wrongly and unexpectedly recognize the content of the encrypted command signal or data signal emitted by the base station B as, say, an unencrypted command signal or data signal K to which it could and even should respond, were the first identifying or start pattern P1, i.e. the first value P1 that the identifying or start pattern assumes, not to suppress any action of this kind.

This ensures that only the first transponder D1, that is intended to respond, does so (=response signal A1 in the right-hand part of the second line in FIG. 2A; see also FIG. 3A), but the second transponder D2, which has not been selected, does not respond under any circumstances (=blank region in the right-hand part of the third line in FIG. 2A; see also FIG. 3A).

The base station B is therefore able to receive the data signal A1, i.e. the signal that is transmitted to it as a response by the first transponder D1 that has been selected, without any errors (=right-hand part of the first line in FIG. 2A; see also FIG. 3A), because the non-selected second transponder D2 does not respond.

If on the other hand, in a similar way, the base station B emits an unencrypted command signal or data signal K provided with the second identifying or start pattern P2 (see the left-hand part of the first line in FIG. 2B, and FIG. 3B), or in other words if the base station B emits an unencrypted command signal or data signal K in which the identifying or start pattern is set to the second value P2 that marks this command signal or data signal K as having been transmitted by the base station B solely for the second transponder D2 that has been selected, and if this command signal or data signal K is received both by the first transponder D1, which has not been selected, (see the left-hand part of the second line in FIG. 2B, and FIG. 3B), and also by the second transponder D2, which has been selected, (see the left-hand part of the third line in FIG. 2B, and FIG. 3B), both the transponders D1, D2 will recognize that the command signal or data signal in question is intended solely for a transponder that is in the unencrypted or plain mode and has thus been selected.

Because the first transponder D1 is in the encrypted or crypto mode and is thus not in the selected state, it ignores the command signal or data signal K emitted by the base station B, even though it would wrongly and unexpectedly recognize the content of the unencrypted command signal or data signal K emitted by the base station B as, say, an encrypted command signal or data signal C to which it could and even should respond, were the second identifying or start pattern P2, i.e. the second value P2 that the identifying or start pattern assumes, not to suppress any action of this kind.

This ensures that only the second transponder D2, that is intended to respond, does so (=response signal A2 in the right-hand part of the third line in FIG. 2B; see also FIG. 3B), but the first transponder D1, which has not been selected, does not respond under any circumstances (=blank region in the right-hand part of the second line in FIG. 2B; see also FIG. 3B).

The base station B is therefore able to receive the data signal A2, i.e. the signal that is transmitted to it as a response by the second transponder D2 that has been selected, without any errors (=right-hand part of the first line in FIG. 2B; see also FIG. 3B), because the non-selected first transponder D1 does not respond.

In a system S (see FIGS. 3A and 3B) having mobile transponders D1, D2, the present invention thus ensures that a clear distinction is made between encrypted command signal or data signals C that are to be transmitted (solely) to given transponders D1 and unencrypted command signals or data signals K that are to be transmitted (solely) to given transponders D2, this being done with the help of different identifying or start patterns P1 and P2 by which the data carriers D1 and D2 are able to differentiate or distinguish between, respectively, the command signals or data signals C and K that are transmitted in different forms.

In this way, it is ensured
  that encrypted command signals or data signals C are not misinterpreted or misunderstood as unencrypted command signals or data signals K by the second transponder D2 (see FIGS. 2A and 3A) and that unencrypted command signals or data signals K are not misinterpreted or misunderstood as encrypted command signals or data signals C by the first transponder D1 (see FIGS. 2B and 3B).

Consequently, by means of different identifying or start patterns P1 and P2, the present invention makes it possible for the error rate to be reduced or errors in the data to be avoided and thus makes possible the reliable transmission of data, and so does in a particularly advantageous way in a system S (see FIGS. 3A and 3B) that is able to avail itself of both encrypted data transmission C (see FIGS. 2A and 3A) and unencrypted data transmission K (see FIGS. 2B and 3B) to the transponder; in principle, this does not affect the method of encryption that is actually used in the particular embodiment.

For this purpose, the signals C and K that the base station B respectively transmits to the data carrier D1 that has been selected and to the data carrier D2 that has been selected have respectively assigned to them, by the method according to the present invention, a first identifying pattern P1 and a second identifying pattern P2 that differs from the first identifying pattern P1, by which patterns the signals C and K can be marked as having been transmitted by the base station B for, respectively, the first data carrier D1 when selected and the second data carrier D2 when selected.

In the data carrier D2 (see FIGS. 2A and 3A) or D1 (see FIGS. 2B and 3B) that has not been selected by the base station B for the transmission of data in the given case, the emission at least of an answering data signal to the base station B in response to reception of, respectively, the command signal or data signal C (see FIGS. 2A and 3A) having the first identifying pattern P1 (see FIGS. 2A and 3A) or the command signal or data signal K (see FIGS. 2B and 3B) having the second identifying pattern P2 (see FIGS. 2B and 3B) is suppressed, and this is done regardless of the rest of the content of the command signal or data signal C or K transmitted by the base station B.

This suppression or non-response is symbolized in FIG. 3A and FIG. 3B by a crossed-out arrow pointing from the non-selected transponder D2 (see FIG. 3A) or D1 (see FIG. 3B) to the base station B.

As has already been indicated, the method described above is implemented in a system S as shown in FIGS. 3A and 3B. In this connection, it can be seen from the representation in FIGS. 3A and 3B that the base station B is implemented in the form of an electronic immobilizer in a means of transport (a motor vehicle).

Associated with this means of transport is a motor-vehicle key by means of which
the locks of the door of the means of transport can be locked and unlocked, and
the engine of the means of transport can be started.

To allow the electronic immobilizer then to be activated when the locks of the doors of the means of transport are locked, or to allow it to be de-activated when the locks of the doors of the means of transport are unlocked, the motor-vehicle key has the (first) transponder.

The electronic immobilizer is able to be de-activated, on only a single communication or transmission channel (<--> an I[ndustry] S[cience] M[edicine] frequency or a R[adio] F[requency]), by means of this correct data carrier D1 (=transponder in the motor-vehicle key, conforming for example to standard ISO 15693 or to draft standard ISO 18000-2 or ISO 18000-3), but not by means of the data carrier D2 (=another transponder in another motor-vehicle key) that may by chance be transported into the operating zone or reading zone of the base station B.

LIST OF REFERENCE NUMERALS

A1 First response signal
A2 Second response signal
B Base station
C Encrypted command signal or data signal
D1 First data carrier, and in particular first transponder, operating particularly in the encrypted or crypto mode
D2 Second data carrier, and in particular second transponder, operating particularly in the unencrypted or plain mode
K Unencrypted command signal or data signal
P1 First identifying pattern, and in particular first start pattern, designed especially for the encrypted or crypto mode
P2 Second identifying pattern, and in particular second start pattern, designed especially for the unencrypted or plain mode
S System

The invention claimed is:

1. A method of transmitting signals between at least one base station and a number of mobile data carriers operating in the crypto mode or in the plain mode, wherein
   [a] the base station emits at least one command signal and/or data signal that is provided with at least one identifying pattern,
   [b] at least one of the data carriers receives the command signal and/or data signal emitted by the base station that is provided with the identifying pattern,
   [c] at least one of the data carriers that receive the command signal and/or data signal transmits to the base station a response signal that is a response to the command signal and/or data signal, and
   [d] the base station receives the response signal transmitted by the data carrier,
characterized in that the identifying pattern
   is in the form of at least one first identifying pattern that identifies the crypto mode, for addressing at least one data carrier operating in the crypto mode, and
   is in the form of at least one second identifying pattern that can be distinguished from the first identifying pattern and that identifies the plain mode, for addressing at least one data carrier operating in the plain mode, wherein the identifying pattern is in the form of at least one code violation, wherein the first identifying pattern and the second identifying pattern differ from one another in respect of their respective lengths.

2. A method as claimed in claim 1, characterized in that the identifying pattern can be distinguished from the data.

3. A method as claimed in claim 1, characterized in that the first identifying pattern and the second identifying pattern differ from one another
   in respect of their respective code violations, and in particular in respect of the form of their respective code violations, and/or
   in respect of their respective start patterns.

4. A system for transmitting signals, having
   at least one base station for emitting at least one command signal and/or data signal provided with at least one identifying pattern,
   a number of mobile data carriers operating in the crypto mode or in the plain mode, at least one of which
   is able to be present and/or move in the operating zone or reading zone of the base station, i.e. in particular within the signal transmission range of the base station,
   receives the command signal and/or data signal, and
   transmits to the base station at least one response signal that is a response to the command signal and/or data signal,
characterized in that the identifying pattern is in the form of at least one first identifying pattern that identifies the crypto mode, for addressing at least one data carrier operating in the crypto mode, and is in the form of at least one second identifying pattern that can be distinguished from the first identifying pattern and that identifies the plain mode, for addressing at least one data carrier operating in the plain mode, wherein the identifying pattern is in the form of at least one code violation, wherein the first identifying pattern and the second identifying pattern differ from one another in respect of their respective lengths.

5. A system as claimed in claim 4, characterized by only one communication or transmission channel employing for example an I[ndustry] S[cience] M[edicine] frequency or a R[adio] F[requency]).

6. A system as claimed in claim 4, characterized in that the data carriers are each in the form of at least one transponder.

7. A system as claimed in claim 4, characterized in that the first identifying pattern and the second identifying pattern are each provided not at the beginning of the command signal and/or data signal.

8. A system as claimed in claim 4, characterized in that the identifying pattern can be distinguished from the data.

9. A system as claimed in claim 4, characterized in that the first identifying pattern and the second identifying pattern differ from one another in respect of their respective code violations, and in particular in respect of the form of their respective code violations, in respect of their respective start patterns.

10. A base station, for a system for transmitting signals as claimed in claim 4.

11. A mobile data carrier, for a system for transmitting signals as claimed in claim 4.

12. Use of the method claimed in claim 1 for clash-free signal transmission for non-contacting chip cards in identification or access control systems (so-called P[assive] K[eyless] L[ntry] systems), arrangements for immobilizers in motor vehicle keys, electronic baggage markers ("baggage tags") for the automatic distribution and sorting of items of baggage in baggage handling operations, at airports say, and electronic memories for sorting and tracking in the transportation of packets and parcels.

13. Use of at least one system as claimed in claim 4 for clash-free signal transmission for non-contacting chip cards in identification or access control systems (so-called P[assive] K[eyless] L[ntry] systems), arrangements for immobilizers in motor vehicle keys, electronic baggage markers ("baggage tags") for the automatic distribution and sorting of items of baggage in baggage handling operations, at airports say, and electronic memories for sorting and tracking in the transportation of packets and parcels.

14. Use of at least one base station as claimed in claim 10 for clash-free signal transmission for non-contacting chip cards in identification or access control systems (so-called P[assive] K[eyless] L[ntry] systems), arrangements for immobilizers in motor vehicle keys, electronic baggage markers ("baggage tags") for the automatic distribution and sorting of items of baggage in baggage handling operations, at airports say, and electronic memories for sorting and tracking in the transportation of packets and parcels.

15. Use of at least one data carrier as claimed in claim 11 for clash-free signal transmission for non-contacting chip cards in identification or access control systems (so-called P[assive] K[eyless] L[ntry] systems), arrangements for immobilizers in motor vehicle keys, electronic baggage markers ("baggage tags") for the automatic distribution and sorting of items of baggage in baggage handling operations, at airports say, and electronic memories for sorting and tracking in the transportation of packets and parcels.

16. A system for transmitting signals, having at least one electronic immobilizer of a motor vehicle for emitting at least one command signal and/or data signal provided with at least one identifying pattern, a number of motor-vehicle keys operating in the crypto mode or in the plain mode, at least one of which is able to be present and/or move in the operating zone or reading zone of the electronic immobilizer, i.e. in particular within the signal transmission range of the electronic immobilizer, receives the command signal and/or data signal, and transmits to the electronic immobilizer at least one response signal that is a response to the command signal and/or data signal, characterized in that the identifying pattern is in the form of at least one first identifying pattern that identifies the crypto mode, for addressing at least one motor-vehicle key operating in the crypto mode, and is in the form of at least one second identifying pattern that can be distinguished from the first identifying pattern and that identifies the plain mode, for addressing at least one motor-vehicle key operating in the plain mode, wherein the first identifying pattern and the second identifying pattern differ from one another in respect of their respective lengths, wherein doors of the motor vehicle are locked and the electronic immobilizer is configured to be activated in the crypto mode, wherein the doors of the motor vehicle are unlocked and the electronic immobilizer is configured to be de-activated in the plain mode.

17. A method as claimed in claim 1, characterized in that the second identifying pattern includes only one bit.

18. A method as claimed in claim 17, characterized in that the first identifying pattern and the second identifying pattern are each provided not at the beginning of the command signal and/or data signal.

19. A method as claimed in claim 18, characterized in that the first identifying pattern and the second identifying pattern are each provided at the end of the command signal and/or data signal.

* * * * *